United States Patent [19]
Maeda

[11] Patent Number: 6,052,014
[45] Date of Patent: Apr. 18, 2000

[54] INTEGRATED CIRCUIT BEING CAPABLE OF TRANSFERRING SIGNALS OF DIFFERENT VOLTAGE LEVELS BETWEEN ITS INPUT AND OUTPUT

[75] Inventor: Shohei Maeda, Tokyo, Japan

[73] Assignee: Mitsubishi Denki Kabushiki Kaisha, Tokyo, Japan

[21] Appl. No.: 09/116,832

[22] Filed: Jul. 17, 1998

[30] Foreign Application Priority Data

Jan. 19, 1998 [JP] Japan .................................. 10-007829

[51] Int. Cl.[7] .......................................................... H03L 5/00
[52] U.S. Cl. .............................. 327/333; 326/63; 326/80
[58] Field of Search .............................. 327/333; 326/80, 326/81, 63, 64

[56] References Cited

U.S. PATENT DOCUMENTS

| | | | |
|---|---|---|---|
| 5,510,731 | 4/1996 | Dingwall | 326/63 |
| 5,623,222 | 4/1997 | Tamagawa | 327/259 |
| 5,661,414 | 8/1997 | Shigehara et al. | 326/81 |
| 5,828,231 | 10/1998 | Bazargan | 326/81 |

FOREIGN PATENT DOCUMENTS

| | | |
|---|---|---|
| 3-145744 | 6/1991 | Japan . |
| 4-336812 | 11/1992 | Japan . |
| 8-172162 | 7/1996 | Japan . |

*Primary Examiner*—Timothy P. Callahan
*Assistant Examiner*—An T. Luu
*Attorney, Agent, or Firm*—Oblon, Spivak, McClelland, Maier & Neustadt, P.C.

[57] ABSTRACT

An input/output pad part <5> comprises an input protection circuit <51> which is connected to an external terminal <OT>, an output buffer <52> which is connected to the input protection circuit <51>, a TTL input detection circuit <53>, a Schmidt type input detection circuit <54> and a voltage conversion part <55>enabling transfer of signals having different voltage levels between the same and an internal circuit. Thus provided is a microcomputer employing different power supply voltages for circuits constructing an input/output part and an internal circuit such as a logic part or a memory part, which is capable of transferring signals of different voltage levels between the internal circuit and the circuits constructing the input/output circuit and performing slew rate control.

9 Claims, 6 Drawing Sheets

6,052,014

INTEGRATED CIRCUIT BEING CAPABLE OF TRANSFERRING SIGNALS OF DIFFERENT VOLTAGE LEVELS BETWEEN ITS INPUT AND OUTPUT

BACKGROUND OF THE INVENTION

1. Field of the Invention

The present invention relates to an integrated circuit, for example a microcomputer, and more particularly, it relates to an integrated circuit utilizing different power supply voltages for circuits constructing an input/output part and an internal circuit.

2. Description of the Background Art

FIG. 8 is a block diagram showing the structure of a conventional microcomputer 10. The microcomputer 10 comprises a CPU (central processing unit) 1, a RAM (random access memory) 2, a ROM (read only memory) 3 and an input/output pad part (input/output interface) 50, which are connected with each other through a data bus DTB and an address bus ADB.

The structure of the input/output pad part 50 is now described with reference to FIG. 9. The input/output pad part 50 comprises an input protection circuit 51 which is connected to an external terminal OT, an output buffer 52 which is connected to the input protection circuit 51, a TTL input detection circuit 53, a Schmidt type input detection circuit 54 and an input/output control circuit 4. A signal supplied to the external terminal OT passes through the input protection circuit 51 and is divided into three paths, if the same is a normal signal. Namely, the signal is divided into the three paths to be supplied to the input/output control circuit 4 as a CMOS input detection signal CM and supplied to the TTL input detection circuit 53 and the Schmidt type input detection circuit 54 respectively.

The input protection circuit 51 is adapted to protect the circuits in the input/output pad part 50 when the external terminal OT is supplied with a nonstandard signal of a high voltage. The operating voltage for the input protection circuit 51 is set at 5 V, for example. If a signal of a voltage exceeding 5 V is inputted, the input protection circuit 51 reduces the voltage to 5 V for outputting this signal. If a signal of a voltage smaller than 0 V is inputted, on the other hand, the input protection circuit 51 increases the voltage to 0 V. Therefore, a 5 V-system signal inputted in the input/output pad part 50 passes through the input protection circuit 51, while a signal outputted from the output buffer 52, which is a 5 V-system signal, passes through the input protection circuit 51 to be outputted from the external terminal OT.

The TTL input detection circuit 53, which is adapted to determine the voltage level of an input signal with the TTL standard, is employed for transferring/receiving signals in the TTL system for supplying its output to the input/output control circuit 4 as a TTL input detection signal TL. On the other hand, a recent microcomputer which is constructed by the CMOS technique requires no specific detection circuit in case of transferring signals in the CMOS system.

The Schmidt type input detection circuit 54, which is adapted to remove noise or the like included in the input signal, is constructed by a Schmidt circuit or the like for supplying its output to the input/output control circuit 4 as a Schmidt type input detection signal ST.

Either the TTL input detection circuit 53 or the Schmidt type input detection circuit 54 is employed in response to the use of the external terminal OT. For example, the TTL input detection circuit 53 is employed when the external terminal OT is used as a memory interface, while the Schmidt type input detection circuit 54 is employed when the external terminal OT is used as a serial communication interface.

A control system for an electronic appliance, particularly a system employing a microcomputer, is generally constructed by semiconductor devices operating with a power supply voltage of 5 V. While the power supply voltage is set at 5 V on the basis of historical factors, it is convenient for transferring signals between semiconductor devices if the microcomputer 10 and all semiconductor devices mounted thereon operate with the same power supply voltage.

However, the specification of such a microcomputer is increasingly sophisticated, and a higher operating frequency is required, for example. If the operating frequency is improved, however, power consumption is disadvantageously increased in proportion to this. Following recent refinement resulting from high integration, high electric fields are caused in the semiconductor devices with the power supply voltage of 5 V, leading to a problem such as characteristic deterioration caused by a hot carrier phenomenon. Such a problem can be solved by lowering the power supply voltage for the microcomputer, and different power supply voltages may be employed for circuits constructing an input/output part and an internal circuit such as a logic part or a memory part. For example, Japanese Patent Laying-Open Gazette No. 4-336812 (1992) or 3-145744 (1991) describes such a structure.

However, this structure leads to a problem in the conformity with the remaining semiconductor devices constructing the system. If the aforementioned microcomputer 10 employs a power supply voltage of 3.3 V, for example, for the internal circuits such as the CPU 1, the RAM 2 and the ROM 3 while driving a semiconductor device externally mounted on the microcomputer 10 with the power supply voltage of 5 V, for example, the input/output pad part 50 must employ the power supply voltage of 5 V to be connected with this semiconductor device. However, the internal circuits operate with the power supply voltage of 3.3 V, and hence signals cannot be directly transferred between the input/output pad part 50 and the internal circuits.

In a general microcomputer, further, different output characteristics are required to a so referred to general port such as a data input/output port, an analog input port or a reset input port and the so-referred to as system port for connecting the microcomputer with an external device such as an externally mounted memory for constructing a system. Namely, the general port must have an output characteristic which is as loose as possible, while the system port must have a steep output characteristic. An operation of varying the output characteristics with terminals is referred to as slew rate control.

SUMMARY OF THE INVENTION

According to a first aspect of the present invention, an integrated circuit comprises: at least one external terminal; at least one input/output part provided corresponding to the at least one external terminal, each operating with a first voltage to transfer/receive a signal to/from a device outside of the integrated circuit through the at least one external terminal corresponding thereto; a control circuit operating with a second voltage to control an operating state of the at least one external terminal through the at least one input/output part; and at least one voltage conversion part provided corresponding to the at least one input/output part, each having a first level shifter for shifting the voltage level of a first signal which is outputted from the control circuit in response to a difference between the first and second voltages, to output a first shifted signal to the at least one input/output part corresponding thereto and a second level shifter for shifting the voltage level of a second signal which is inputted from the at least one input/output part corresponding thereto in response to the difference to output a second shifted signal to the control circuit.

Preferably, according to a second aspect of the present invention, in the integrated circuit of the first aspect, at least one port is constructed with the at least one external terminal, the at least one input/output part, the at least one voltage conversion part.

Preferably, according to a third aspect of the present invention, in the integrated circuit of the second aspect, the at least one port is a plurality of ports.

Preferably, according to a fourth aspect of the present invention, in the integrated circuit of the third aspect, a first of the plurality of ports operates with the first voltage, and a second of the plurality of ports operates with the second voltage.

Preferably, according to a fifth aspect of the present invention, in the integrated circuit of the fourth aspect, the first of the plurality of ports is employed as a general port, and the second of the plurality of ports is employed as a system port.

Preferably, according to a sixth aspect of the present invention, in the integrated circuit of the third aspect, the first level shifter comprises: an input terminal being supplied with the first signal and an output terminal for outputting the first shifted signal, a series-connected body of first and second transistors of different conductivity types being supplied with the first voltage between its ends, a series-connected body of third and fourth transistors of different conductivity types being supplied with the first voltage between its ends, and an inverter, operating with the first voltage, having an input end being connected to the input terminal and an output end being connected to a control electrode of the fourth transistor, a control electrode of the first transistor is connected to a node between the third and fourth transistors, a control electrode of the third transistor is connected to a node between the first and second transistors, the control electrode of the second transistor is connected to the input terminal, the node between the third and fourth transistors is connected to the output terminal, and the channel widths of the first to fourth transistors of a first of the plurality of ports are set smaller than the channel widths of the first to fourth transistors of a second of the plurality of ports.

Preferably, according to a seventh aspect of the present invention, in the integrated circuit of the sixth aspect, the first of the plurality of ports is employed as a general port, and the second of the plurality of ports is employed as a system port.

Preferably, according to an eighth aspect of the present invention, in the integrated circuit of the first aspect, the at least one input/output part includes a plurality of input/output parts one of which is an output buffer, the first level shifter is provided in corresponding relation to the output buffer, and the first signal is an output enable signal.

Preferably, according to a ninth aspect of the present invention, in the integrated circuit of the first aspect, the at least one input/output part includes a plurality of input/output parts one of which is a TTL input detection circuit, the second level shifter is provided in corresponding relation to the TTL input detection circuit, and the second signal is a TTL input detection signal.

Preferably, according to a tenth aspect of the present invention, in the integrated circuit of the first aspect, the at least one input/output part includes a plurality of input/output parts one of which is a Schmidt type input detection circuit, the second level shifter is provided in corresponding relation to the Schmidt type input detection circuit, and the second signal is a Schmidt type input detection signal.

In the integrated circuit of the present invention, the first signal outputted from the control circuit is level-shifted and outputted to the input/output part as the first shifted signal while the second signal outputted from the input/output part is level-shifted and supplied to the control circuit as the second shifted signal, whereby the signals can be transferred also when different power supply voltages are employed for the circuits constructing the input/output part and the internal circuit constructed by a logic part or a memory part.

The integrated circuit of the present invention supplies the first port employed as a general port and the second port employed as a system port with power supply voltages from different power sources. Thus, the microcomputer can independently change the power supply voltage for the input/output part which is connected with the system port, so that various semiconductor devices having different power supply voltages can be mounted thereon.

In the integrated circuit of the present invention, the first port employed as a general port has a loose output characteristic while the second port employed as a system port has a steep characteristic, thereby enabling desired slew rate control. Further, the microcomputer performs slew rate control by adjusting the channel widths of the transistors constructing the first level shifter, whereby no dedicated circuit is required for performing slew rate control but the device can be miniaturized.

An object of the present invention is to provide an integrated circuit, employing different power supply voltages for circuits constructing an input/output part and an internal circuit such as a logic part or a memory part, which is capable of transferring signals of different voltage levels between the internal circuit and the circuits constructing the input/output circuit and performing slew rate control.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
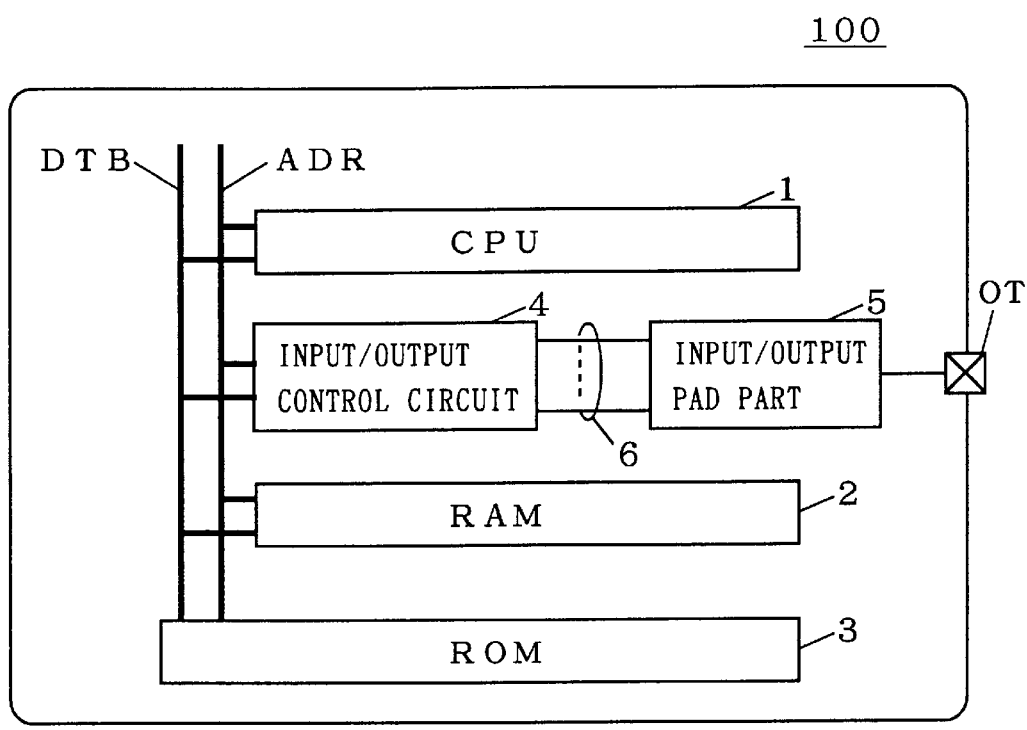
FIG. 1 is a block diagram illustrating the structure of an integrated circuit according to an embodiment of the present invention.

FIG. 1 is a block diagram showing the structure of a microcomputer 100 according to an embodiment of the present invention. In the following description, a power source supplying a potential of 5 V and a ground potential in a pair is referred to as a 5 V-system power source, and a signal supplied from a semiconductor device operating with the 5 V-system power source is referred to as a 5 V-system signal. Similarly, a power source supplying a potential of 3.3 V and the ground potential in a pair is referred to as a 3.3 V-system power source, and a signal supplied from a semiconductor device operating with the 3.3 V-system power source is referred to as a 3.3 V-system signal.

A-1. Structure of Microcomputer 100

The microcomputer 100 comprises a CPU 1, a RAM 2, a ROM 3, an input/output control circuit 4 and an input/output pad part (input/output interface) 5. The input/output pad part 5 is arranged in the vicinity of an external terminal OT, while the input/output control circuit 4 is arranged on a position separating from the input/output pad part 5. A control signal line group 6 connects the input/output pad part 5 and the input/output control circuit 4 with each other. The CPU 1, the RAM 2, the ROM 3 and the input/output control circuit 4 are connected with each other through a data bus DTB and an address bus ADB. The CPU 1, the RAM 2, the ROM 3 and the input/output control circuit 4 are supplied with the 3.3 V-system power source, for example, while the input/output pad part 5 is supplied with the 5 V-system power source and the 3.3 V-system power source, for example.

The input/output control circuit 4 and the input/output pad part 5 are constructed as different modules and arranged at a distance, in order to prevent noise generated in the input/output pad part 5 having a high power supply voltage, i.e., a high operating voltage from influencing the input/output control circuit 4, so that the microcomputer 100 is resistant to electromagnetic interference (EMI).

A-2. Structure of Input/Output Pad Part 5

Figure 2:
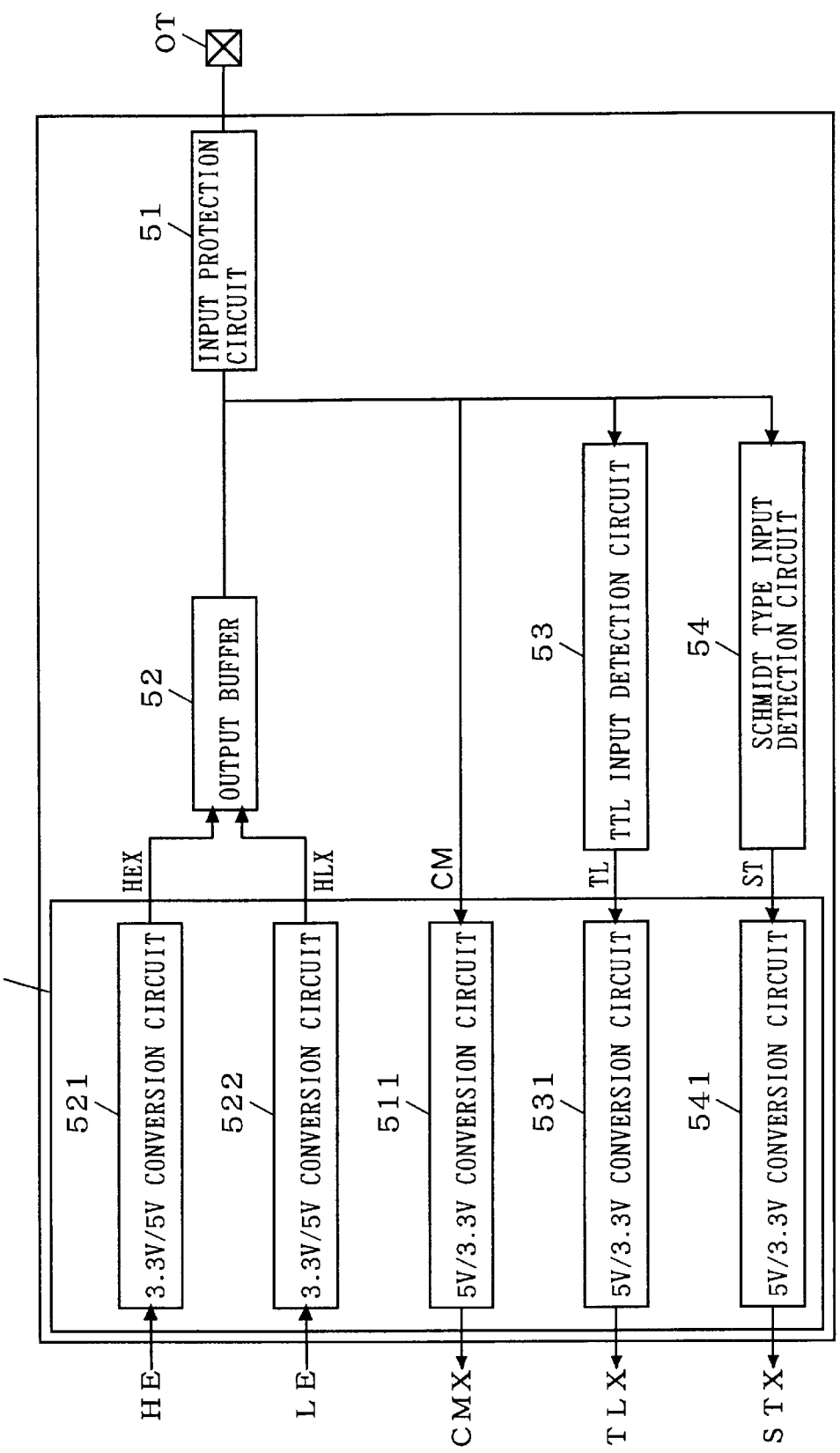
FIG. 2 is a block diagram illustrating a partial structure of the integrated circuit according to the embodiment of the present invention.

The structure of the input/output pad part 5 is now described with reference to FIG. 2. The input/output part 5 comprises an input protection circuit 51 which is connected to the external terminal OT, an output buffer 52 which is connected to the input protection circuit 51, a TTL (transistor transistor logic) input detection circuit 53, a Schmidt type input detection circuit 54, and a voltage conversion part 55 enabling transfer of signals of different voltage levels between the same and the internal circuits. In the input/output pad part 5, the structure other than the voltage conversion part 55, i.e., the set of the input protection circuit 51, the output buffer 52, the TTL input detection circuit 53 and the Schmidt type input detection circuit 54 can be generically referred to as an input/output part. This input/output part, i.e., the set of the input protection circuit 51, the output buffer 52, the TTL input detection circuit 53 and the Schmidt type input detection circuit 54, operates with the 5 V-system power source.

The structures and operations of the input protection circuit 51, the output buffer 52, the TTL input detection circuit 53 and the Schmidt type input detection circuit 54 are similar to those of the prior art, and a CMOS input detection signal CM, a TTL input detection signal TL and a Schmidt type input detection signal ST are supplied to the voltage conversion part 55.

The voltage conversion part 55 comprises a 5 V/3.3 V conversion circuit 511 for converting the CMOS input detection signal CM which is a 5 V-system signal to a 3.3 V-system signal, a 5 V/3.3 V conversion circuit 531 for converting the TTL input detection signal TL which is a 5 V-system signal to a 3.3 V-system signal, a 5 V/3.3 V conversion circuit 541 for converting the Schmidt type input detection signal ST which is a 5 V-system signal to a 3.3 V-system signal, and 3.3 V/5 V conversion circuits 521 and 522 (first level shifters) for converting output enable signals HE and LE (first signals) which are 3.3 V-system signals outputted from the input/output control circuit 4 to 5 V-system signals.

Outputs of the 5 V/3.3 V conversion circuits 511, 531 and 541 are supplied to the input/output control circuit 4 as a converted CMOS input detection signal CMX, a converted TTL input detection signal TLX and a converted Schmidt type input detection signal STX respectively, while outputs of the 3.3 V/5 V conversion circuits 521 and 522 are supplied to the output buffer 52 as converted output enable signals HEX and LEX (first shifted signals) respectively.

Figure 3:
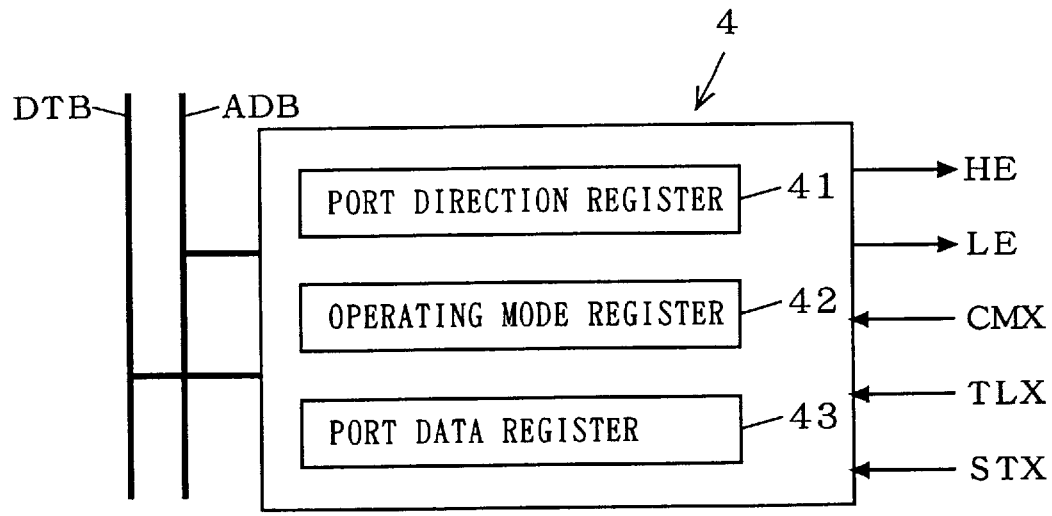
FIG. 3 is a block diagram illustrating another partial structure of the integrated circuit according to the embodiment of the present invention.

FIG. 3 shows the structure of the input/output control circuit 4. The structure and function of the input/output control circuit 4 are similar to those of the prior art. The input/output control circuit 4 comprises circuits such as a port direction register 41, an operating mode register 42 and a port data register 43 for controlling the operating state of the external terminal OT. The input/output control circuit 4 is connected with the data bus DTB and the address bus ADB, in order to transfer/receive data to/from the internal circuits through these registers 41, 42 and 43.

While the external terminal OT does not independently function as a port but must be combined with the input/output pad part 5 constructed by the voltage conversion part 55 and the input/output part for constructing a port, the external terminal OT is referred to as a port in the following description, in order to simplify the illustration. Namely, the expression that the external terminal OT is employed as an input port means that the combination of the external terminal OT and the input/output pad part 5 is employed as the input port.

The operating mode register 42 has a function of switching the operating mode of the external terminal OT for serving as the input port (port mode) or as an input of a timer, for example. The port direction register 41 has a function of setting the use of the external terminal OT to be employed as the input port or as an output port when the operating mode register 42 indicates the port mode.

The port data register 43 has a function of reading or writing data in or from the external terminal OT when the external terminal OT is employed as an input/output port. When the operating mode register 42 indicates the port mode and the port direction register 41 indicates an input, the port data register 43 indicates a logical value (data) corresponding to the voltage level of the external terminal OT. When the port direction register 41 indicates an output and a logical value (data) is written in the port data register 43, on the other hand, a voltage corresponding to the logical value is outputted to the external terminal OT.

The input/output control circuit 4 has a function of outputting the output enable signals HE and LE for setting the output of the external terminal OT at high and low levels respectively.

The output buffer 52 receives signals corresponding to the output enable signals HE and LE, passes the same through the input protection circuit 51 and outputs the same to the external terminal OT. If both of the output enable signals HE and LE are invalid, the external terminal OT enters a high impedance state (HiZ state).

A-3. Structure and Operation of Voltage Conversion Part 55

Figure 4:
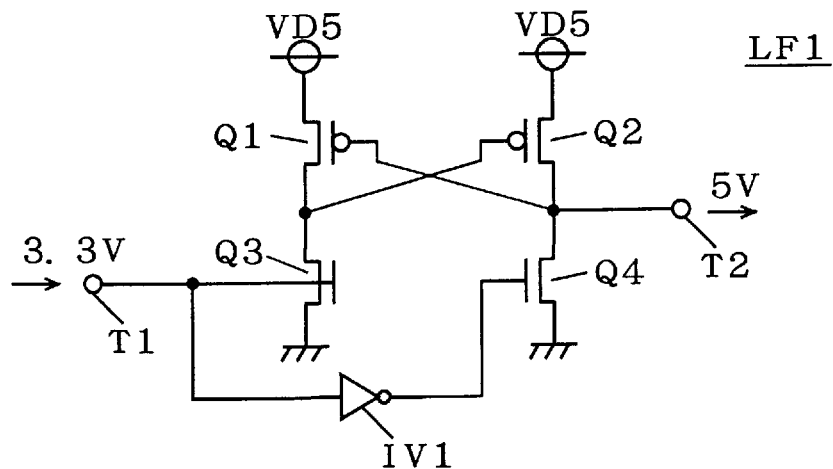
FIG. 4 is a circuit diagram illustrating the structure of a level shifter provided in the integrated circuit according to the embodiment of the present invention.

With reference to FIG. 4, a level shifter LF1 (first level shifter) constructing each of the 3.3 V/5 V conversion circuits 521 and 522 is now described.

The level shifter LF1 comprises an input terminal T1, an output terminal T2, an inverter IV1 having an output end and an input end which is connected to the input terminal T1 for operating with the 3.3 V-system power source, PMOS transistors Q1 and Q2, and NMOS transistors Q3 and Q4. The sources of the transistors Q1 and Q2 are connected to power sources VD5, while sources of the transistors Q3 and Q4 are grounded. The gate of the transistor Q1 and the drains of the transistors Q2 and Q4 are connected to the output terminal T2 in common. The gate of the transistor Q2 and the drains of the transistors Q1 and Q3 are connected in common. The gates of the transistors Q3 and Q4 are connected to the input and output ends of the inverter IV1 respectively. The power sources VD5 supply voltages of 5 V.

Figure 5:
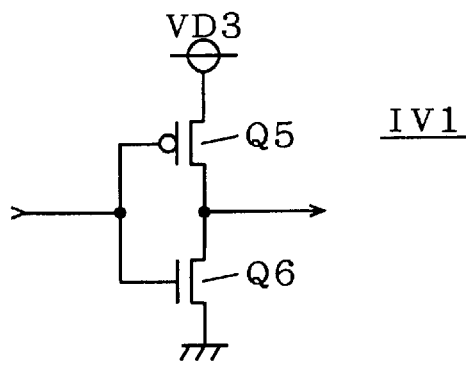
FIG. 5 is a circuit diagram illustrating the structure of the level shifter provided in the integrated circuit according to the embodiment of the present invention.

FIG. 5 shows the structure of the inverter IV1. The inverter IV1 is constructed by a PMOS transistor Q5 and an NMOS transistor Q6 which are serially connected with each other between a power source VD3 and the ground, and the gates of the transistors Q5 and Q6 are connected in common to construct the input end of the inverter IV1 while the drains of the transistors Q5 and Q6 are connected in common to construct the output end of the inverter IV1. The power source VD3 supplies a voltage of 3.3 V.

The operation of the level shifter LF1 is now described. A control signal which is supplied to the input end of the inverter IV1 through the input terminal T1 is a 3.3 V-system signal so that the inverter IV1 operates with the 3.3 V-system power source, whereby the gate of the transistor Q4 is supplied with a potential corresponding to logic which is reverse to that corresponding to a potential supplied to the gate of the transistor Q3 and a control signal corresponding to the potentials of the power sources VD5, i.e., a 5 V-system signal is obtained from the output terminal T2.

Figure 6:
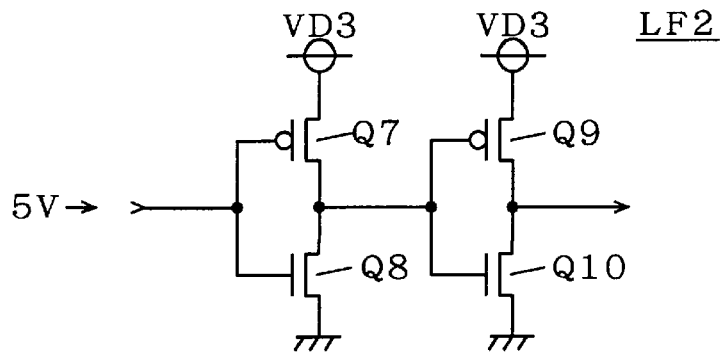
FIG. 6 is a circuit diagram illustrating the structure of the level shifter provided in the integrated circuit according to the embodiment of the present invention.

With reference to FIG. 6, each of the 5 V/3.3 V conversion circuits 511, 531 and 541 is now described. Each of the 5 V/3.3 V conversion circuits 511, 531 and 541 is constructed by a level shifter LF2 (second level shifter). The level shifter LF2 comprises a PMOS transistor Q7 and an NMOS transistor Q8 which are serially connected between a power source VD3 and the ground, and a PMOS transistor Q9 and an NMOS transistor Q10 which are serially connected between another power source VD3 and the ground. The gates of the PMOS transistor Q7 and the NMOS transistor Q8 are connected in common to construct an input end of the level shifter LF2, while a node between the PMOS transistor Q7 and the NMOS transistor Q8 is connected to the gates of the PMOS transistor Q9 and the NMOS transistor Q10 in common and that between the PMOS transistor Q9 and the NMOS transistor Q10 constructs an output end of the level shifter LF2. The PMOS transistor Q7 and the NOS transistor Q8, which are supplied with 5 V-system signals in the gates thereof, are constructed by voltage-resistant transistors (withstand voltage: at least 5 V), in order to prevent gate oxide films from breaking. The PMOS transistor Q9 and the NMOS transistor Q10, which are supplied with 3.3 V-system signals in the gates thereof, may not be particularly resistant to high voltages.

The operation of the level shifter LF2 is now described. When a 5 V system signal is supplied to the input end of the level shifter LF2, the potential of the node between the PMOS transistor Q7 and the NMOS transistor Q8 becomes substantially equal to the ground potential and the PMOS transistor Q9 enters an ON state, so that a control signal corresponding to the potentials of the power sources VD3, i.e., a 3.3 V-system signal is obtained at the output end of the level shifter LF2.

A-4. Slew Rate Control

Slew rate control of the microcomputer 100 is now described. In case of performing slew rate control, the microcomputer 100 can adjust the output characteristic of the external terminal OT by adjusting those of the level shifters LF1 constructing the 3.3 V/5 V conversion circuits 521 and 522 in the voltage conversion part 55.

When the external terminal OT is employed as the input/output port (general port), a loose output characteristic is required and hence the microcomputer 100 reduces the channel widths (transistor sizes) of the PMOS transistors Q1 and Q2 and the NMOS transistors Q3 and Q4 constructing the level shifters LF1, thereby reducing the quantity of a main current flowing in each transistor and retarding the switching operation, to loosen the output characteristics of the level shifters LF1, i.e., that of the external terminal OT as a result.

When the external terminal OT is employed as a port (system port) for connection with an externally mounted memory, on the other hand, a steep output characteristic is required and hence the microcomputer 100 increases the channel widths (transistor sizes) of the PMOS transistors Q1 and Q2 and the NMOS transistors Q3 and Q4 constructing the level shifters LF1 thereby increasing the quantity of the main current flowing in each transistor and quickening the switching operation, to steepen the output characteristics of the level shifters LF1, i.e., that of the external terminal OT. The channel widths of the transistors Q1, Q2, Q3 and Q4 are set on the basis of the required output characteristic.

The output characteristic of the external terminal OT is finally decided by that of the output buffer 52. Therefore, the output buffer 52 is so set that its output characteristic is as steep as possible. For example, the output buffer 52 is designed on the basis of such an ideal state that a signal having rise and fall times close to zero is supplied to its input. In practice, however, the output enable signals HEX and LEX supplied to the input of the output buffer 52 have prescribed rise and fall times. Therefore, the output characteristic of the output buffer 52 cannot remain at the designed value.

The slew rate control utilizes this phenomenon, for adjusting the output characteristic of the output buffer 52, i.e., that of the external terminal OT by adjusting the circuits on the front stages of the output buffer 52. Therefore, the microcomputer 100 can relatively steepen or loosen the output characteristic of the output buffer 52 by changing the channel widths of the PMOS transistors Q1 and Q2 and the NMOS transistors Q3 and Q4 although the output characteristic of the output buffer 52 cannot be made steeper than the designed value (ideal value) even if the channel widths of the PMOS transistors Q1 and Q2 and the NMOS transistors Q3 and Q4 are maximized.

A-5. Effect

As hereinabove described, the microcomputer 100 comprises the voltage conversion part 55 between the input/ output part (the input protection circuit 51, the input/output buffer 52, the TTL input detection circuit 53 and the Schmidt type input detection circuit 54) operating with the 5 V-system power source and the input/output control circuit 4 operating with the 3.3 V-system power source for converting the voltage levels of the signals transferred therebetween. Thus, the microcomputer 100 can transfer the signals also when the same employs different power supply voltages for the circuits constructing the input/output part and an internal circuit such as a logic part or a memory part.

Further, the microcomputer can perform slew rate control by adjusting the channel widths of the transistors provided on the input/output pad part 5 for constructing the voltage conversion part 55, whereby no dedicated circuit may be provided for performing slew rate control but the device can be miniaturized.

A-6. Modification

While the above description has been made on a structure for connecting a semiconductor device operating with the 5 V-system power source to the microcomputer 100 having the input/output pad part 5 supplied with the 5 V-system and 3.3 V-system power sources, it is not necessary to connect all such input/output pad parts 5 to common 5 V- and 3.3 V-system power sources.

Figure 7:
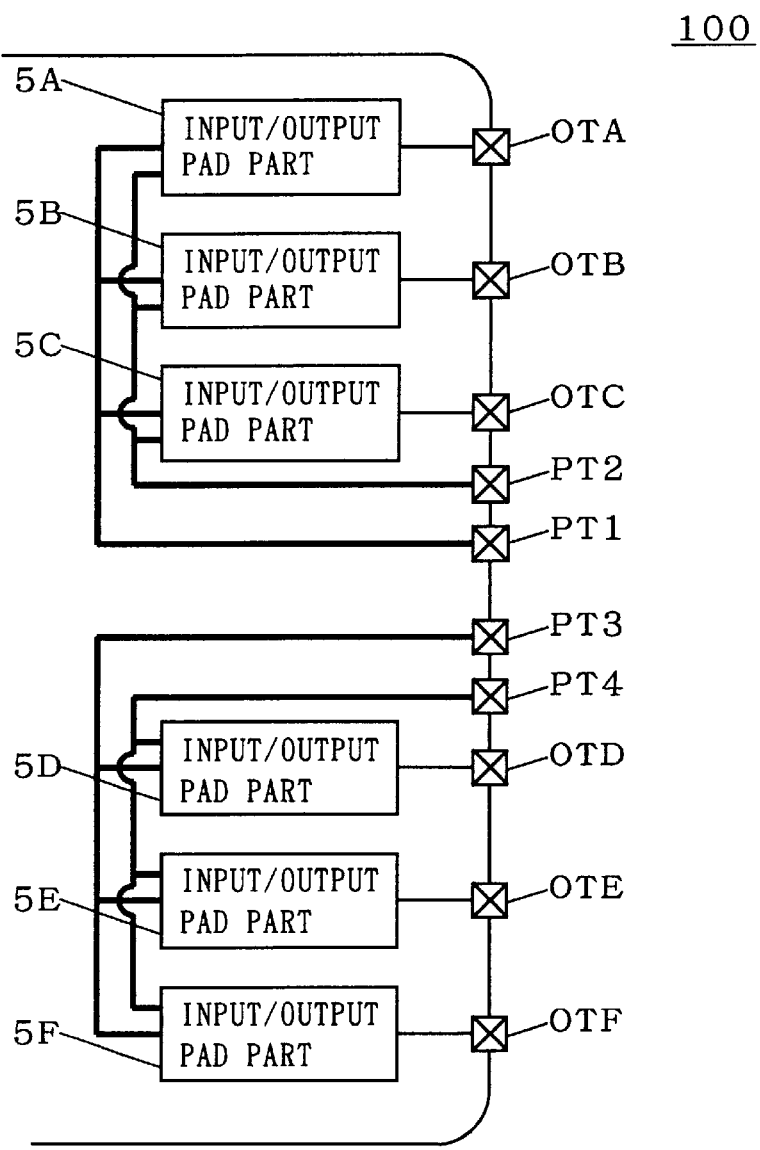
FIG. 7 is a block diagram illustrating the structure of an integrated circuit according to a modification of the embodiment of the present invention.
Figure 8:
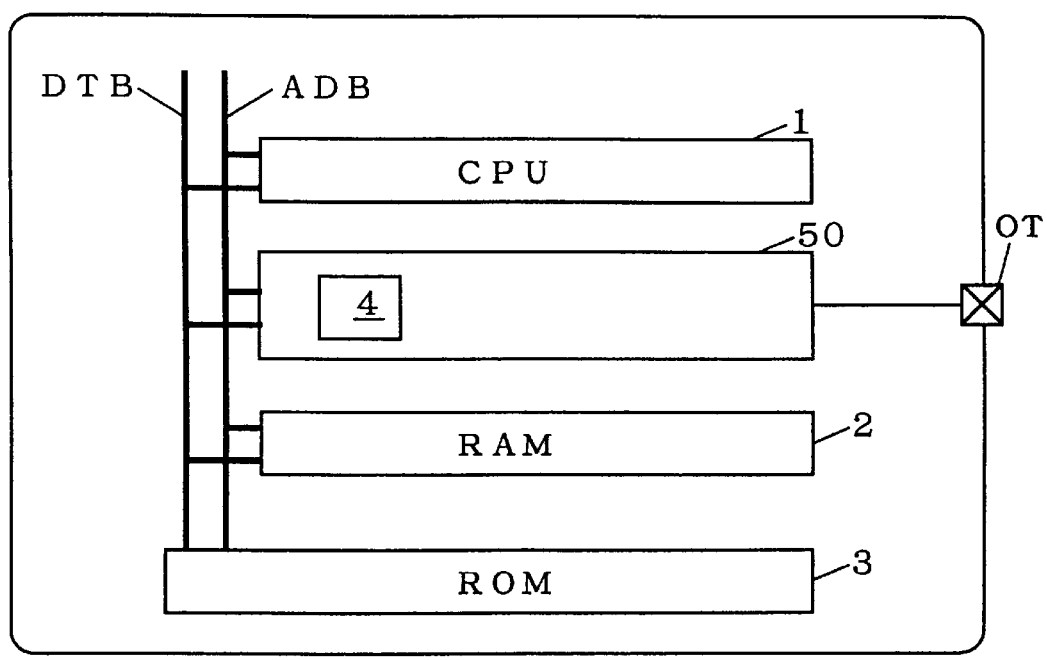
FIG. 8 is a block diagram illustrating the structure of a conventional microcomputer.
Figure 9:
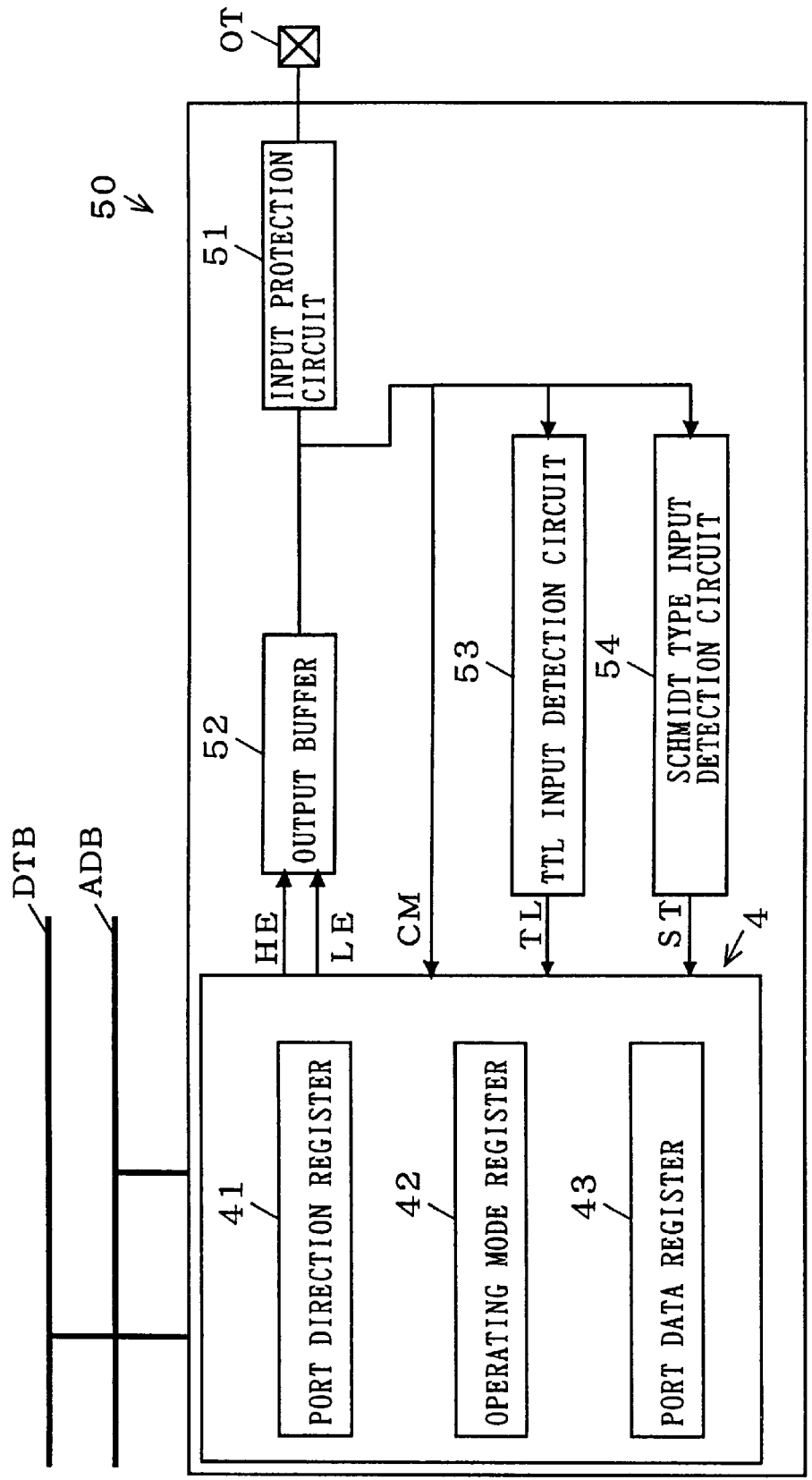
FIG. 9 is a block diagram illustrating a partial structure of the conventional microcomputer.

Namely, input pad parts which are connected to external terminals employed as ports (system ports) for connection with external memories and as input/output ports (general ports) respectively may be separately supplied with operating voltages. FIG. 7 is a conceptual diagram of this structure.

Referring to FIG. 7, external terminals OTA to OTC, which are employed as general ports, are connected with input/output pad parts 5A to 5C respectively. The input/output pad parts 5A to 5C are supplied with operating voltages of 3.3 V and 5 V from general port power supply terminals PT1 and PT2 respectively.

On the other hand, external terminals OTD to OTF, which are employed as system ports, are connected with input/output pad parts 5D to 5F respectively. The input/output pad parts 5D to 5F are supplied with operating voltages of 3.3 V and 5 V from general port power supply terminals PT3 and PT4 respectively. FIG. 7 omits illustration of an input/output circuit 4. The input pad parts 5A to 5F are identical in structure to the input/output pad part 5 described with reference to FIG. 2.

Thus, the power supply voltages for the input/output pad parts 5D to 5F which are connected with the system ports can be lowered by supplying the operating voltages for the input/output pad parts 5A to 5C and 5D to 5F corresponding to the general ports and the system ports from different power sources respectively, to be capable of coping with semiconductor devices implemented with lower voltages.

Namely, recent semiconductor devices are mainly provided with 3.3 V-system power sources, and high-performance semiconductor devices cannot be employed in case of assembling a system with only semiconductor devices of 5 V-system power sources. In particular, high-speed operations are required to memories, and employment of memories of 3.3 V-system power sources is indispensable. When voltages of 3.3 V are supplied from the system port power supply terminals PT3 and PT4 to the input/output pad parts 5D to 5F which are connected with the system ports, therefore, it is possible to connect memories operating with the 3.3 V-system power sources.

While the operation of the input/output pad part 5 described with reference to FIG. 2 with the 3.3 V-system power source results in operations of the input protection circuit 51, the output buffer 52 which is connected with the input protection circuit 51, the TTL input detection circuit 53 and the Schmidt type input detection circuit 54 with the 3.3 V-system power sources, there is no problem in operation. While none of the 5 V/3.3 V conversion circuits 511, 531 and 541 and the 3.3 V/5 V conversion circuits 521 and 522 performs voltage conversion, these circuits merely serve as delay circuits and cause no hindrance on the operation of the microcomputer 100.

While the above description has been made on the semiconductor devices operating with the 3.3 V-system power sources and the 5 V-system power sources, the present invention is not restricted to this. Even if the operating voltages are further lowered and semiconductor devices mainly operate with a 2 V-system power source or a 1 V-system power source in the future, for example, the present invention is also applicable to such semiconductor devices, as a matter of course.

While the invention has been shown and described in detail, the following description is in all aspects illustrative and restrictive. It is therefore understood that numerous modifications and variations can be devised without departing from the scope of the invention.

I claim:

1. An integrated circuit comprising:

at least one external terminal;

at least one input/output part provided corresponding to said at least one external terminal, each operating with a first voltage to transfer/receive a signal to/from a device outside of said integrated circuit through said at least one external terminal corresponding thereto;

a control circuit operating with a second voltage, different from the first voltage, to define a function of said at least one external terminal through said at least one input/output part; and at least one voltage conversion part connected between the at least one input/output part and the control circuit, and provided corresponding to said at least one input/output part, each having a first level shifter for shifting a voltage level of a first signal at the second voltage which is outputted from said control circuit in response to a difference between said first and second voltages, to output a first shifted signal at the first voltage to said at least one input/output part corresponding thereto, and a second level shifter for shifting a voltage level of a second signal at the first voltage which is inputted from said at least one input/output part corresponding thereto in response to said difference to output a second shifted signal at the second voltage to said control circuit, wherein at least one port is constructed with said at least one external terminal, said at least one input/output part, said at least one voltage conversion part.

2. The integrated circuit in accordance with claim 1, wherein said at least one port is a plurality of ports.

3. The integrated circuit in accordance with claim 2, wherein a first of said plurality of ports operates with said first voltage, and a second of said plurality of ports operates with said second voltage.

4. The integrated circuit in accordance with claim 3, wherein said first of said plurality of ports is employed as a general port, and said second of said plurality of ports is employed as a system port.

5. The integrated circuit in accordance with claim 2, wherein said first level shifter comprises:
an input terminal being supplied with said first signal and an output terminal for outputting said first shifted signal,
a series-connected body of first and second transistors of different conductivity types being supplied with said first voltage between its ends,
a series-connected body of third and fourth transistors of different conductivity types being supplied with said first voltage between its ends, and
an inverter, operating with said first voltage, having an input end being connected to said input terminal and an output end being connected to a control electrode of said fourth transistor,
a control electrode of said first transistor is connected to a node between said third and fourth transistors,
a control electrode of said third transistor is connected to a node between said first and second transistors,
said control electrode of said second transistor is connected to said input terminal,
said node between said third and fourth transistors is connected to said output terminal, and
the channel widths of said first to fourth transistors of a first of said plurality of ports are set smaller than the channel widths of said first to fourth transistors of a second of said plurality of ports.

6. The integrated circuit in accordance with claim 5, wherein said first of said plurality of ports is employed as a general port, and said second of said plurality of ports is employed as a system port.

7. The integrated circuit in accordance with claim 1, wherein said at least one input/output part includes a plurality of input/output parts one of which is an output buffer, said first level shifter is provided in corresponding relation to said output buffer, and said first signal is an output enable signal.

8. The integrated circuit in accordance with claim 1, wherein said at least one input/output part includes a plurality of input/output parts one of which is a TTL input detection circuit, said second level shifter is provided in corresponding relation to said TTL input detection circuit, and said second signal is a TTL input detection signal.

9. The integrated circuit in accordance with claim 1, wherein said at least one input/output part includes a plurality of input/output parts one of which is a Schmidt type input detection circuit, said second level shifter is provided in corresponding relation to said Schmidt type input detection circuit, and said second signal is a Schmidt type input detection signal.

* * * * *